(12) United States Patent
Han et al.

(10) Patent No.: US 7,295,784 B2
(45) Date of Patent: Nov. 13, 2007

(54) APPARATUS AND METHOD FOR PERFORMING ELECTRICALLY BAND-LIMITED OPTICAL DIFFERENTIAL PHASE SHIFT KEYING MODULATION

(75) Inventors: Jin Soo Han, Daejeon (KR); Youn Seon Jang, Daejeon (KR); Hyun Jae Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 547 days.

(21) Appl. No.: 10/892,890

(22) Filed: Jul. 15, 2004

(65) Prior Publication Data

US 2005/0135816 A1  Jun. 23, 2005

(30) Foreign Application Priority Data

Dec. 18, 2003  (KR) ............ 10-2003-0093483

(51) Int. Cl.
*H04B 10/04* (2006.01)
(52) U.S. Cl. ............ 398/201; 398/188; 398/190; 398/193
(58) Field of Classification Search ........ 398/188, 398/193, 201, 190–191
See application file for complete search history.

(56) References Cited

U.S. PATENT DOCUMENTS

| | | | | |
|---|---|---|---|---|
| 5,543,952 A * | 8/1996 | Yonenaga et al. | ......... | 398/185 |
| 6,559,996 B1 * | 5/2003 | Miyamoto et al. | ......... | 398/183 |
| 2003/0002121 A1 | 1/2003 | Miyamoto et al. | | |
| 2003/0007216 A1 | 1/2003 | Chraplyvy et al. | | |
| 2003/0090768 A1 | 5/2003 | Liu et al. | | |
| 2004/0076440 A1 * | 4/2004 | Wedding | .......... | 398/188 |
| 2004/0105686 A1 * | 6/2004 | Lee et al. | .......... | 398/188 |
| 2004/0165893 A1 * | 8/2004 | Winzer | .......... | 398/161 |
| 2005/0105916 A1 | 5/2005 | Lee et al. | | |

OTHER PUBLICATIONS

Optical Differential Phase Shift Keying (DPSK) direct detection considered as a duobinary signal, 2 pages, Penninckx et al, Opt. Communications, ECOC 2001, vol. 3, pp. 456-457.
1.6 Tb/s (40×40 Gb/s) DPSK Transmission with Direct Detection, Jan. 2003, Bisse ssur et al, Electronic Letters, vol. 39, Issue 2, pp. 192-193.

* cited by examiner

*Primary Examiner*—Leslie Pascal
(74) *Attorney, Agent, or Firm*—Blakely Sokoloff Taylor & Zafman

(57) ABSTRACT

The present invention relates to an apparatus and method for performing optical Differential Phase Shift Keying (DPSK) modulation, which transmits a phase difference between adjacent bits as information. The electrically band-limited optical DPSK modulating apparatus includes a light source, a Non-Return-to-Zero (NRZ) signal generator, a pre-coder, an electrical low pass filter, and a phase modulator. The NRZ signal generator generates a NRZ signal. The pre-coder codes the NRZ signal generated by the NRZ signal generator into a differential signal. The low pass "filter electrically limits a bandwidth of the differential signal obtained through the pre-coder. The phase modulator modulates an optical signal input from the light source into a DPSK signal using the differential signal having the bandwidth electrically limited by the low pass filter.

3 Claims, 5 Drawing Sheets and modulating an optical signal input from the light source into a DPSK signal using the differential signal having the bandwidth electrically limited by the low pass filter.

APPARATUS AND METHOD FOR PERFORMING ELECTRICALLY BAND-LIMITED OPTICAL DIFFERENTIAL PHASE SHIFT KEYING MODULATION

BACKGROUND OF THE INVENTION

1. Field of the Invention

The present invention relates, in general, to optical modulation schemes and, more particularly, to an apparatus and method for performing optical differential phase shift keying modulation, which transmits a phase difference between adjacent bits as information.

2. Description of the Related Art

In a current optical transmission system, a Non-Return-to-Zero (NRZ) modulation scheme has been generally used. However, with the increase of the data rate of the optical transmission system, the limitations of the NRZ modulation scheme have appeared. Therefore, a new modulation scheme has been developed. A Differential Phase Shift Keying (DPSK) modulation scheme is one of new modulation schemes.

Generally, a DPSK modulation scheme, which transmits information using the phase of a transmitted carrier signal, includes information in a phase difference between adjacent bits and transmits the information. It is well known that DPSK modulation can further ensure a margin of 2 to 3 dB in terms of optical Signal to Noise (S/N) ratio compared to the NRZ modulation.

Methods of implementing DPSK modulation can be classified into three types: A first type is to use a phase modulator, in which a modulating signal is applied to an optical phase modulator to maintain the constant intensity of a DPSK modulated signal and change only the phase thereof; a second type is to generate a Return-to-Zero (RZ) pulse signal and vary the phase of the pulse signal using a phase modulator or a Mach-Zehnder intensity modulator, in which the intensity of an optical signal has an RZ-format and has opposite phases depending on a modulating signal; and a third type is to apply an electrical modulating signal to a Mach-Zehnder intensity modulator, in which the phase of a DPSK modulated signal changes and the intensity thereof rapidly changes in a transition region when the state of the applied modulating signal changes.

In the above-described third DPSK modulation scheme, a single Mach-Zehnder modulator is used. In this case, a voltage of $2V\pi$ centered at a transmission null point is applied to the Mach-Zehnder modulator, thus allowing the phases of the modulated signal to be opposite to each other at the signal levels "1" and "0" thereof. Such a conventional modulation scheme is implemented to perform coding using a pre-coder, amplify the coded signal using a high-speed driver, and immediately apply the amplified signal to an optical modulator, thus obtaining an optical DPSK modulated signal. All electrical/optical devices used in this case use the entire bandwidth corresponding to a data rate. However, if the entire bandwidth corresponding to the data rate is used as in the case of the conventional scheme, there are problems in that, in the case of high-speed transmission in Wavelength Division Multiplexing (WDM) optical transmission, the spectrum of a modulated optical signal is widened, so that the modulated optical signal may be sensitive to dispersion and it is not possible to narrow an interval between channels.

In the meantime, a method, which generates a signal strong at chromatic dispersion and non-linearity by allowing a DPSK signal to pass through a Mach-Zehnder interferometer and then forming a RZ signal, is disclosed in U.S. Pat. Publication No. US2003/0002121 entitled "Optical transmitter and optical transmission system". Further, a method of transmitting an RZ-DPSK signal to a distributed managed transmission channel to reduce a non-linear phenomenon is disclosed in U.S. Pat. Publication No. US2003/007216 entitled "Long haul transmission in a dispersion managed optical communication system". Further, a method of reducing an intra-channel non-linear phenomenon and the influence of Polarization Mode Dispersion (PMD) by applying a polarization interleaving method to a DPSK modulation scheme is disclosed in U.S. Pat. Publication No. US2003/0090768 entitled "Long haul optical communication system". However, the conventional methods are problematic in that influences due to crosstalk between adjacent channels and dispersion, occurring when high-speed transmission is performed using the DPSK modulation, cannot be solved.

SUMMARY OF THE INVENTION

Accordingly, the present invention has been made keeping in mind the above problems occurring in the prior art, and an object of the present invention is to provide an apparatus and method for performing electrically band-limited optical DPSK modulation, which can reduce crosstalk between adjacent channels and the influence of dispersion at the time of wavelength division multiplexing optical transmission.

In order to accomplish the above object, the present invention provides an apparatus for performing electrically band-limited optical Differential Phase Shift Keying (DPSK) modulation, comprising a light source; a Non-Return-to-Zero (NRZ) signal generator for generating a NRZ signal; a pre-coder for coding the NRZ signal generated by the NRZ signal generator into a differential signal; an electrical low pass filter for electrically limiting a bandwidth of the differential signal obtained through the pre-coder; and a phase modulator for modulating an optical signal input from the light source into a DPSK signal using the differential signal having the bandwidth electrically limited by the low pass filter.

Preferably, the phase modulator may comprise at least two high-speed drivers for amplifying the differential signal having the limited bandwidth, which is input to the phase modulator; and a Mach-Zehnder modulator provided with cosine transfer characteristics and driven in a push-pull manner using the high-speed driver.

Preferably, the low pass filter may be arranged between the high-speed driver and the Mach-Zehnder modulator.

Preferably, the low pass filter may be included in the Mach-Zehnder modulator.

Preferably, the low pass filter may electrically limit the bandwidth of the differential signal obtained through the pre-coder within a range of 60 to 80% of a data rate.

In addition, the present invention provides a method of performing electrically band-limited optical Differential Phase Shift Keying (DPSK) modulation, comprising the steps of generating a Non-Return-to-Zero (NRZ) signal; coding the generated NRZ signal into a differential signal; electrically limiting a bandwidth of the differential signal; and modulating an optical signal input from a predetermined light source into a DPSK signal using the differential signal having the electrically limited bandwidth.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
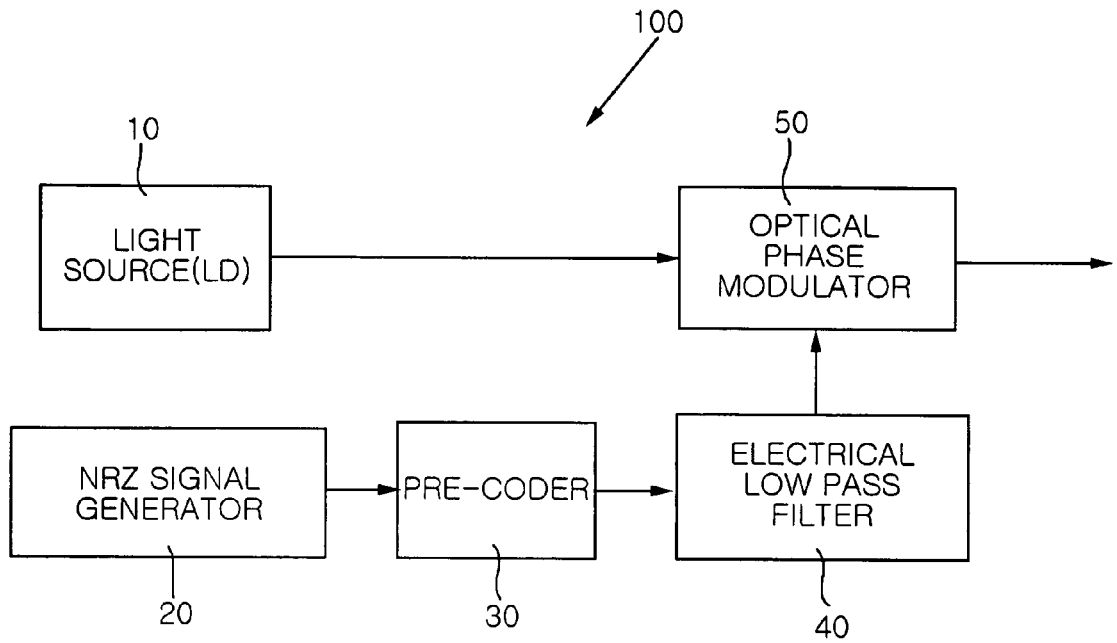
FIG. 1 is a view showing the construction of an optical DPSK modulating apparatus according to an embodiment of the present invention.

Hereinafter, embodiments of the present invention will be described in detail with reference to the attached drawings. Reference now should be made to the drawings, in which the same reference numerals are used throughout the different drawings to designate the same or similar components. In the present specification, if it is determined that a detailed description of related art or construction unnecessarily makes the gist of the present invention unclear, the detailed description thereof will be omitted.

FIG. 1 is a view showing the construction of an optical DPSK modulating apparatus according to an embodiment of the present invention.

Referring to FIG. 1, an optical DPSK modulating apparatus 100 of the present invention includes a light source 10, a NRZ signal generator 20, a pre-coder 30, an electrical low pass filter 40 and an optical phase modulator 50. Hereinafter, the detailed functions of the optical DPSK modulating apparatus 100 and an electrically band-limited optical DPSK modulating method using the optical DPSK modulating apparatus 100 are described.

The light source 10, which outputs an optical signal, may be implemented as a Laser Diode (LD). The NRZ signal generator 20 generates and outputs an NRZ signal. The NRZ signal output from the NRZ signal generator 20 is provided to the pre-coder 30 as an input signal. The pre-coder 30 codes the NRZ signal output from the NRZ signal generator 20 into a differential signal. The differential signal output from the pre-coder 30 is provided to the low pass filter 40 as an input signal. The low pass filter 40 performs the function of electrically band-limiting the differential signal output from the pre-coder 30. Both the optical signal output from the light source 10 and a signal output from the low pass filter 40 are provided to the optical phase modulator 50 as input signals. The optical phase modulator 50 modulates the optical signal output from the light source 10 using the electrically band-limited signal provided from the low pass filter 40. The optical phase modulator 50 can be implemented as a Mach-Zehnder modulator. A structure in which the low pass filter is connected to an input terminal of the Mach-Zehnder modulator is used even when an optical duobinary signal is generated. In this case, the bandwidth of a low pass filter used when the optical duobinary signal is generated corresponds to ¼ of a data rate. A reason for using a low pass filter with a bandwidth corresponding to ¼ of a data rate is to obtain a two-level optical duobinary signal by electrically generating a three-level signal and inputting the three-level signal to the Mach-Zehnder modulator. An optical duobinary signal, generated using the low pass filter with a bandwidth corresponding to ¼ of a data rate, and an optical DPSK signal, generated using the low pass filter with a bandwidth corresponding to 60 to 80% of a data rate as in the case of the present invention, correspond to two different modulated signals.

Figure 2:
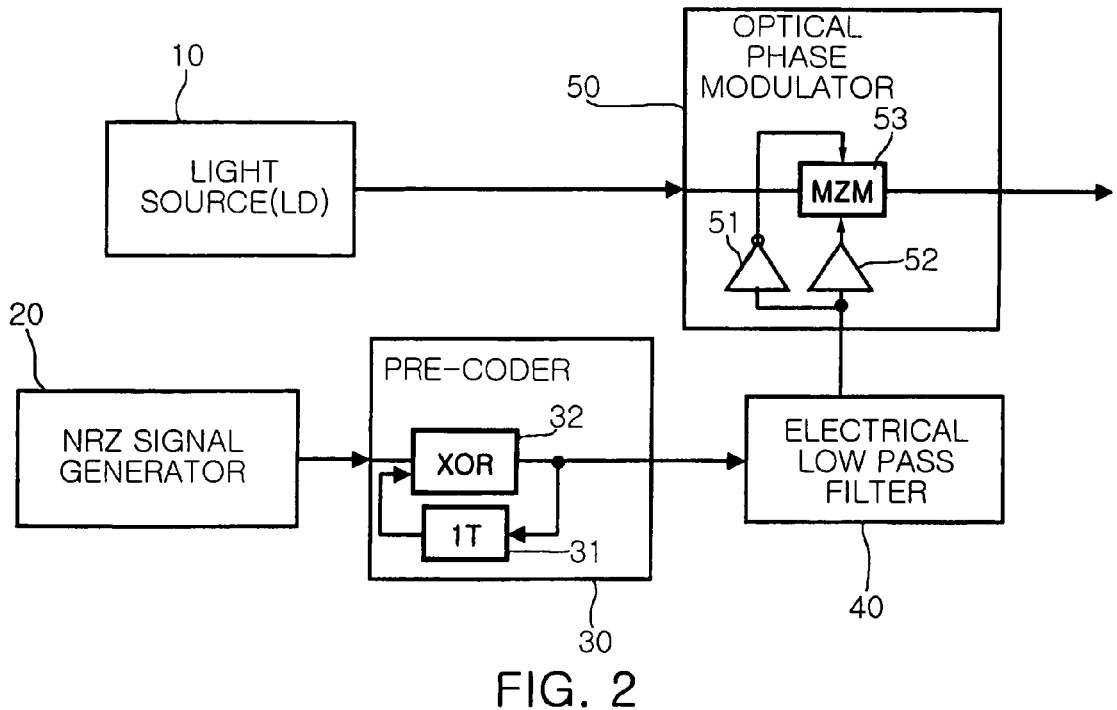
FIG. 2 is a view showing the detailed construction of a pre-coder and an optical phase modulator according to an embodiment of the present invention.

FIG. 2 is a view showing the detailed construction of the pre-coder and the optical phase modulator according to an embodiment of the present invention.

Referring to FIG. 2, the pre-coder 30 of the present invention includes a 1-bit time delayer 31 and an Exclusive OR (XOR) gate 32. An input terminal of the XOR gate 32 is connected to an output terminal of the NRZ signal generator 20. An output terminal of the XOR gate 32 is connected to input terminals of both the low pass filter 40 and the time delayer 31. An output terminal of the time delayer 31 is connected to the input terminal of the XOR gate 32.

The optical phase modulator 50 of the present invention includes high-speed drivers 51 and 52 and a Mach-Zehnder modulator 53. Input terminals of the high-speed drivers 51 are connected to an output terminal of the low pass filter 40, and output terminals thereof are connected to the Mach-Zehnder modulator 53. The high-speed drivers 51 and 52 amplify the signal electrically band-limited by the low pass filter 40. The Mach-Zehnder modulator 53 is driven in a push-pull manner using the high-speed drivers 51 and 52.

The low pass filter 40 can be arranged between the high-speed drivers 51 and 52 and the Mach-Zehnder modulator 53. Moreover, the low pass filter 40 can be included in the Mach-Zehnder modulator 53. If the low pass filter 40 is included in the Mach-Zehnder modulator 53, the Mach-Zehnder modulator 53 can use frequency characteristics lower than those of the data rate, so that the optical DPSK modulating apparatus 100 can be manufactured more economically.

Figure 3:
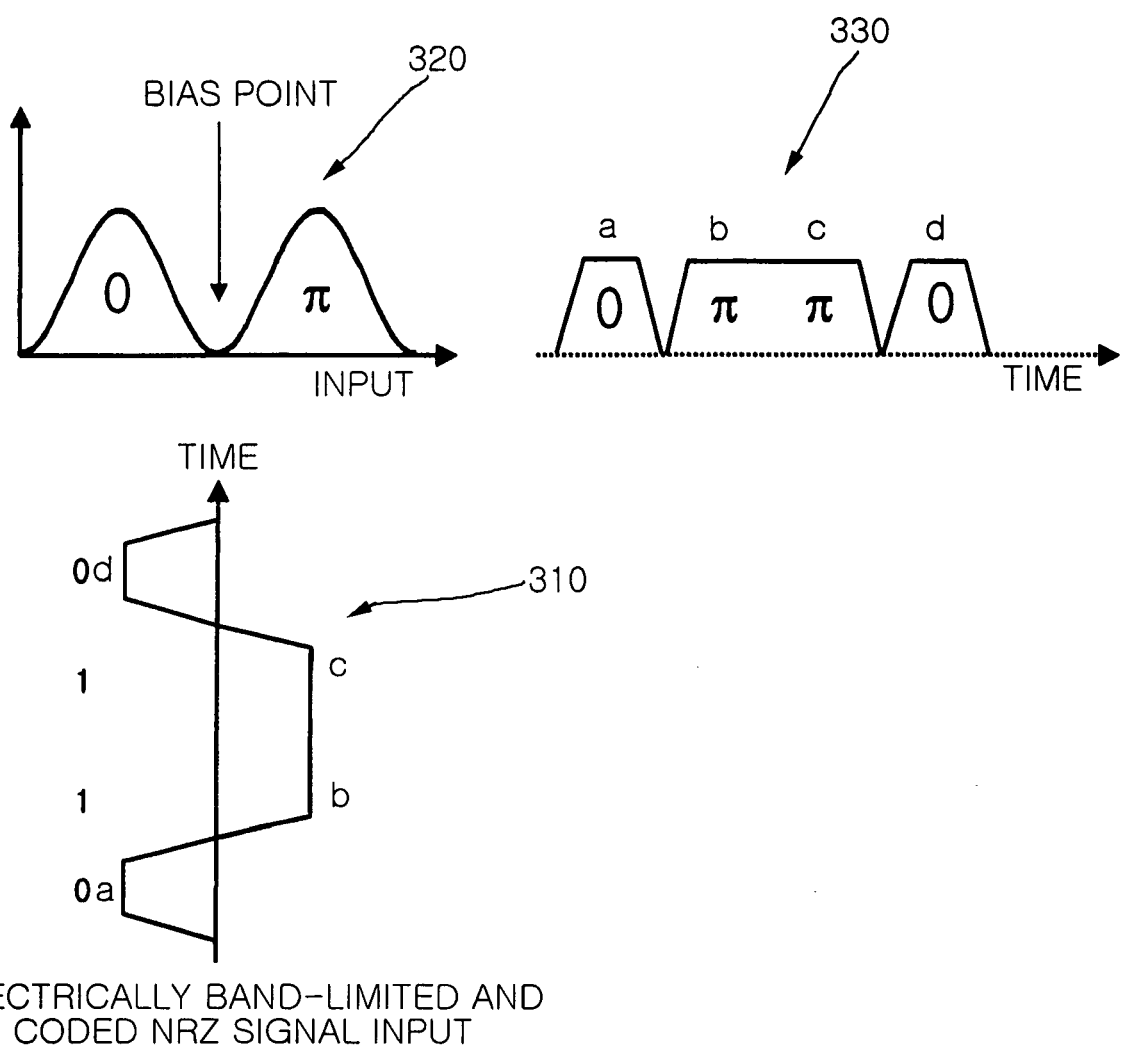
FIG. 3 is a view showing a process of generating a phase modulated signal using a Mach-Zehnder modulator according to an embodiment of the present invention.

FIG. 3 is a view showing a process of generating a phase modulated signal using the Mach-Zehnder modulator according to an embodiment of the present invention.

Referring to FIG. 3, an output signal 320 of the Mach-Zehnder modulator 53 has cosine transfer characteristics. The output signal 320 of the Mach-Zehnder modulator 53 is generated in such a way that, when a drive signal of $2V\pi$ centered at a point corresponding to a bias point and indicating a minimum output level, that is, a transmission null point, is applied to the modulator 53, "0" and "1" signals having opposite phases, respectively, are output. The Mach-Zehnder modulator 53 is driven by the electrically band-limited and coded NRZ signal. Further, the Mach-Zehnder modulator 53 outputs an optical DPSK modulated signal 330 in the time sequence of "a" to "d" of FIG. 3.

Figure 4:
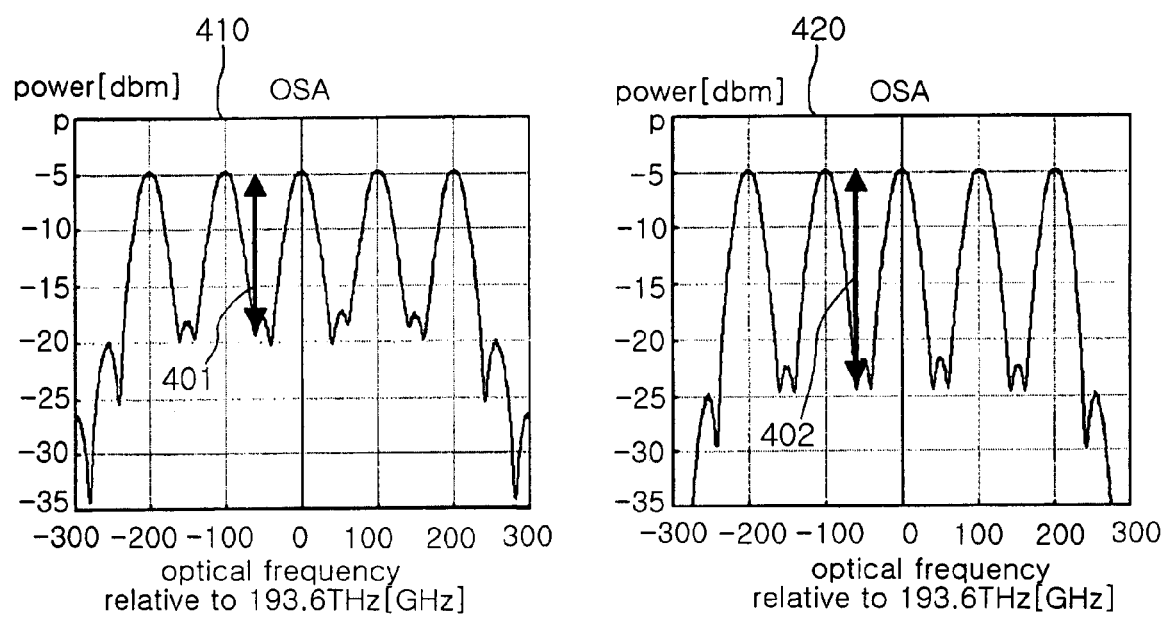
FIG. 4 is a view comparing the influences of crosstalk between adjacent channels in WDM optical transmission with each other.

FIG. 4 illustrates graphs comparing optical spectrums, obtained when a conventional optical DPSK modulated signal and the optical DPSK modulated signal of the present invention are multiplexed, with each other.

A graph 410 on the left portion of FIG. 4 shows an optical spectrum obtained when typical DPSK signals are multiplexed according to a conventional modulation scheme. Further, a graph 420 on the right portion of FIG. 4 shows an optical spectrum obtained when DPSK signals generated by the optical DPSK modulating apparatus 100 including the low pass filter 40 according to the present invention are multiplexed.

Referring to FIG. 4, as shown in the left graph 410, in the conventional modulation scheme, the extent to which typical DPSK signals overlap with those of adjacent channels is approximately 14.7 dB 401. In contrast, as shown in the right graph 420, in the modulating apparatus of the present invention, the extent to which DPSK signals, generated using the low pass filter 40, overlap with those of adjacent channels is approximately 19.7 dB 402. There is a difference of 5 dB between the conventional modulation scheme and the modulating apparatus of the present invention. Accordingly, when the low pass filter 40 is used according to the present invention, the influence of crosstalk between adjacent channels can be further decreased.

Figure 5:
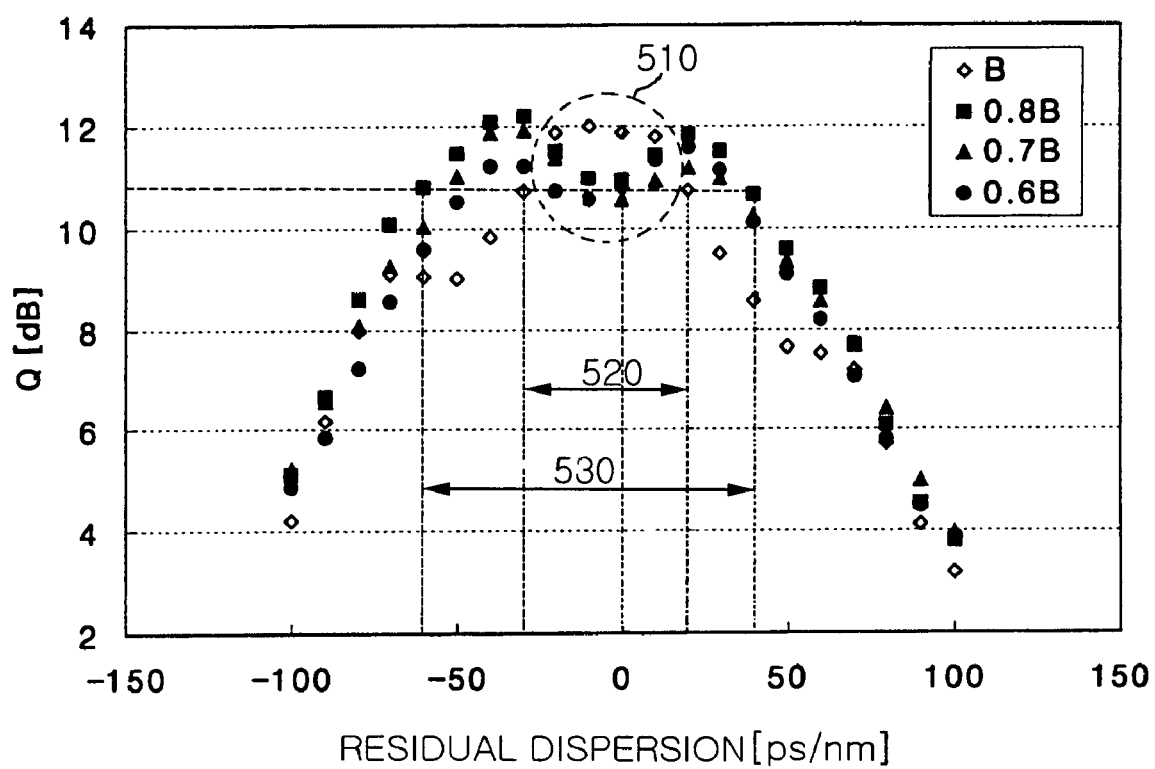
FIG. 5 is a view showing a transmission performance (Q-factor) versus the residual dispersion according to electrical bandwidths.

FIG. 5 is a graph showing a transmission performance (Q-factor) versus the residual dispersion obtained when transmission is performed through a channel with a data rate of 40 Gb/s over a single mode optical fiber with a length of 640 km at an optical intensity of +4 dBm.

In FIG. 5, a transmission performance of B obtained when the conventional modulation scheme without using the low pass filter 40 is used, a transmission performance of 0.8 B obtained when the low pass filter 40 with a bandwidth corresponding to 80% of the data rate is used, a transmission performance of 0.7 B obtained when the low pass filter 40 with a bandwidth corresponding to 70% of the data rate, and a transmission performance of 0.6 B obtained when the low pass filter 40 with a bandwidth corresponding to 60% of the data rate is used, are compared to each other.

Referring to FIG. 5, it can be seen that, when the low pass filter 40 is not used (B), the transmission performance is rapidly decreased even though the residual dispersion is only slightly changed. In contrast, it can be seen that, when the low pass filter 40 is used (0.8 B, 0.7 B and 0.6 B), an excellent transmission performance can be obtained over a wide range except for a region 510 where the residual dispersion is close to "0".

When the residual dispersion is "0" 510, the reason that the transmission performance obtained in the case where the low pass filter 40 is used (0.8 B, 0.7 B and 0.6 B) is slightly decreased compared to that obtained in the case where the low pass filter 40 is not used (B) is that eye opening is slightly decreased due to the limitations in bandwidth. However, the allowance of the residual dispersion enabling a Q-factor of 11 dB to be obtained corresponds to approximately 40 ps/nm 520 when the low pass filter 40 is not used (B). In contrast, it can be seen that the allowance thereof is approximately 100 ps/nm 530 when the low pass filter 40 with a bandwidth corresponding to 80% of the data rate is used. As described above, if the low pass filter 40 is used according to the present invention, very excellent dispersion characteristics can be obtained compared to the conventional modulation scheme.

Figure 6:
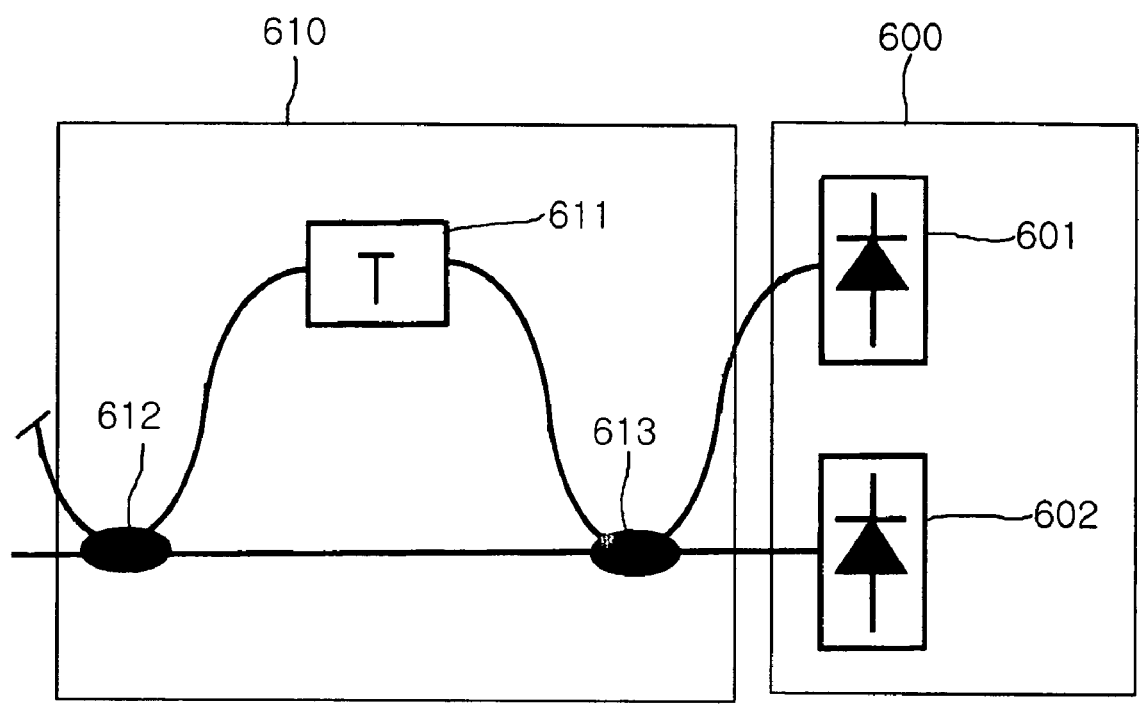
FIG. 6 is a view showing a receiver for receiving an optical DPSK modulated signal according to an embodiment of the present invention.

FIG. 6 is a view showing a receiver for receiving an optical DPSK modulated signal according to an embodiment of the present invention.

Referring to FIG. 6, a receiver 600 for receiving an optical DPSK modulated signal according to the present invention includes two Photo Diodes (PDs) 601 and 602. The receiver 600 receives an optical signal through a Mach-Zehnder interferometer 610. The Mach-Zehnder interferometer 610 includes a 1-bit time delayer 611 and directional couplers 612 and 613. The Mach-Zehnder interferometer 610 converts the phase information of the optical signal into intensity information.

The receiver 600 causes constructive interference at the first photo diode 601 and destructive interference at the second photo diode when the phases of two adjacent signals input through the Mach-Zehnder interferometer 610 are the same, while it causes destructive interference at the first photo diode and constructive interference at the second photo diode when the phases thereof are different. The receiver employing the two photo diodes 601 and 602 in this way is called a balanced receiver, in which a better S/N ratio can be obtained.

As described above, the electrically band-limited optical DPSK modulating apparatus 100 of the present invention codes a NRZ signal generated by the NRZ signal generator 20 through the use of the pre-coder 30, limits the bandwidth of the coded signal using the low pass filter 40, and applies the electrically bandwidth-limited signal to the Mach-Zehnder modulator 53 through the high-speed drivers 51 and 52, so that the optical signal output from the light source 10, such as a laser diode, is modulated in an optical DPSK manner. Therefore, the modulated optical signal has advantages in transmission because the optical signal is phase-modulated in the DPSK manner, and the width of its optical spectrum narrows, so that crosstalk between adjacent channels can be reduced in a high-density Wavelength Division Multiplexing (WDM) scheme. Further, the influence of dispersion is decreased due to the narrow spectrum, so that the width of the allowable residual dispersion widens.

As described above, the present invention provides an apparatus and method for performing electrically band-limited optical DPSK modulation, which limits the bandwidth of an electrical signal applied to a Mach-Zehnder modulator when an optical DPSK signal is generated, thus reducing the influence of crosstalk between adjacent channels in WDM optical transmission. Further, the present invention is advantageous to high-density WDM transmission.

Further, the present invention is advantageous in that, when modulation is performed using an optical DPSK scheme employing a low pass filter, an optical spectrum narrows, so that the influence of dispersion is decreased and the allowance of the residual dispersion widens.

Moreover, the present invention is advantageous in that it employs a Mach-Zehnder modulator including a low pass filter and having low frequency response characteristics, thus enabling an optical DPSK modulating apparatus having a narrow optical spectrum to be easily implemented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for performing electrically band-limited optical Differential Phase Shift Keying (DPSK) modulation, comprising:
 a light source;
 a Non-Return-to-Zero (NRZ) signal generator for generating a NRZ signal;
 a pre-coder for coding the NRZ signal generated by the NRZ signal generator into a differential signal;

an electrical low pass filter for electrically limiting a bandwidth of the differential signal obtained through the pre-coder; and a Mach-Zehnder modulator provided with cosine transfer function characteristics and driven in a push-pull manner for modulating an optical signal input from the light source into a DPSK signal using the differential signal having the bandwidth electrically limited by the low pass filter, wherein the low pass filter electrically limits the bandwidth of the differential signal obtained through the pre-coder within a range of 60 to 80% of a data rate.

2. The electrically band-limited optical DPSK modulating apparatus according to claim 1, wherein the low pass filter is included in the Mach-Zehnder modulator.

3. A method of performing electrically band-limited optical Differential Phase Shift Keying (DPSK) modulation, comprising the steps of:

generating a Non-Return-to-Zero (NRZ) signal; coding the generated NRZ signal into a differential signal;

electrically limiting a bandwidth of the differential signal; and modulating an optical signal input from a predetermined light source into a DPSK signal using the differential signal having the electrically limited bandwidth, wherein, at the bandwidth limiting step, the bandwidth of the differential signal is electrically limited within a range of 60 to 80% of a data rate.

* * * * *